C. W. SNEDEKER.
LOCK.
APPLICATION FILED FEB. 18, 1921.
1,430,196. Patented Sept. 26, 1922.
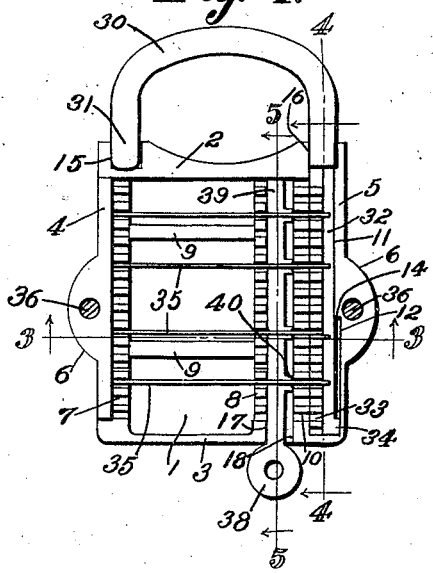
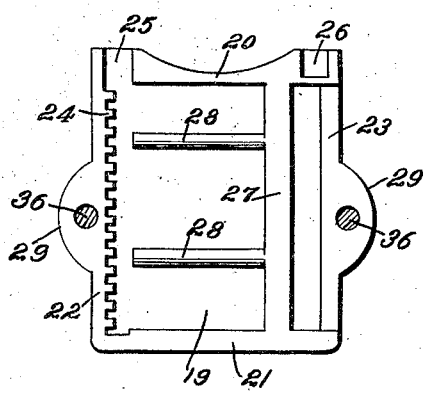
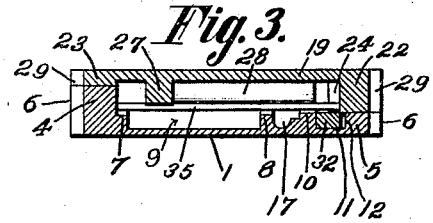
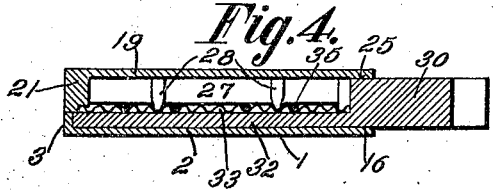
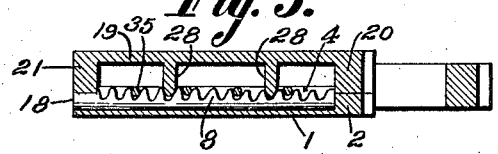
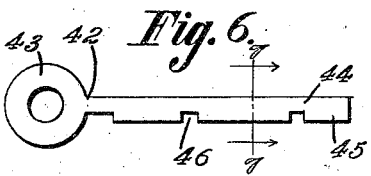
Inventor
C. W. Snedeker
By C. A. Snow & Co.
Attorneys Patented Sept. 26, 1922.

1,430,196

UNITED STATES PATENT OFFICE.

CHARLES W. SNEDEKER, OF KINGSTON, NEW YORK.

LOCK.

Application filed February 18, 1921. Serial No. 446,085.

*To all whom it may concern:*

Be it known that I, CHARLES W. SNEDEKER, a citizen of the United States, residing at Kingston, in the county of Ulster and State of New York, have invented a new and useful Lock, of which the following is a specification.

The device forming the subject matter of this application is a pad lock, and the invention aims to improve the construction of the tumblers, and to provide novel means for mounting, controlling and operating the tumblers, to the end that the lock may be adapted readily to keys of different sorts.

In the drawings:—Figure 1 shows in elevation one member of the lock, the other member of the lock being removed, the shackle, the tumblers and the key being in place; Figure 2 is a plan showing the other member of the lock; Figure 3 is a section on the line 3—3 of Figure 1; Figure 4 is a section on the line 4—4 of Figure 1; Figure 5 is a section on the line 5—5 of Figure 1; Figure 6 is a plan showing the master key; Figure 7 is a cross section on the line 7—7 of Figure 6; Figure 8 is a plan showing the key which, ordinarily, is used in opening the lock.

The lock forming the subject matter of this application comprises a case including two members, one of which is delineated in Figure 1, the other of which is shown in Figure 2.

The member of the lock case depicted in Figure 1 embodies a plate 1, an end 2, and end 3, and sides 4 and 5, the sides having outstanding ears 6. A rack 7 is formed integrally with the side 4 and with the plate 1 and extends longitudinally of the lock, the teeth of the rack 7 extending transversely of the lock, that is, from the side 4 toward the side 5. A rack 8 extends longitudinally of the lock, in parallel relation to the rack 7, between the ends 2 and 3, the rack 8 preferably being formed integrally with the plate 1. Reinforcing fins 9 are fashioned integrally with the plate 1 and extend, transversely of the lock, between the racks 7 and 8. A rack 10 extends longitudinally of the lock, between the ends 2 and 3, the rack 10 being located parallel to the rack 8, the teeth of the rack 10 extending transversely of the lock, like the teeth of the rack 8 and the teeth of the rack 7. The space between the rack 8 and the rack 10 forms a keyway 17. In the end 3 there is a key hole 18 alined with the keyway 17. The space between the rack 10 and the side 5 forms a guide groove 11. The guide groove 11 opens through the end 2, as shown at 16. At one end of the guide groove 11, a lateral enlargement 12 is formed in the side 5, the enlargement 12 defining a shoulder 14. The end 2 has a depression 15.

Passing to the member of the lock case which is shown in Figure 2, there is provided a plate 19 having ends 20 and 21, and sides 22 and 23. The side 22 is provided with a rack 24, the teeth of which project inwardly, that is, at right angles to the teeth of the racks 10, 8 and 7. An opening 25 is formed in the end 20 adjacent to the rack 24. Adjacent to the side 23, the end 20 has a depression 26. A rib 27 is formed integrally with the plate 19 and extends between the ends 20 and 21, the rib being disposed close to the side 23 and parallel thereto. Wards 28 project laterally from the rib 27, toward the rack 24 and preferably are formed integrally with the plate 19. The sides 23 and 22 have outstanding ears 29.

The numeral 30 marks a shackle having a free end 31 and including a shank 32 provided with a rack 33. At its inner end, the shank 32 of the shackle 30 is supplied with a projection 34.

Tumblers 35 are provided, the same being in the form of rods which, preferably, have some resiliency.

The numeral 37 marks a key, comprising a head 38 and a body 39, the body having transversely projecting fingers 40 provided in their ends with notches 41.

A master key 42 is supplied, the same including a head 43 and a body 44 having an outstanding flange 45 provided with notches 46.

The shank 32 of the shackle 30 is placed in the guide groove 11, as shown in Figure 1, the projection 34 on the shank of the shackle being received in the lateral enlargement 12 of the guide groove 11. The projection 34 cooperates with the shoulder 14 to prevent the complete withdrawal of the shank 32 of the shackle 30 from the lock case. The key 37 is inserted into the keyway 17 through the key hole 18, until the inner end of the key abuts against the end 2. The tumblers 35 are mounted in place, in alinement with the notches 41 in the fingers 40 of the key 37. Each tumbler 35 at one end, is seated in the rack 7, the said end of the tumbler being held in place, because the rib 27 engages the tumbler adjacent to the rack 7 (see Figure 3). The intermediate portion of the tumbler 35 cooperates with the rack 8, the tumbler extending across the key way 17 and cooperating with the rack 10. The tumblers 35, adjacent to their free ends, are engaged with the rack 33 on the shank 32 of the shackle 30: consequently, the shackle cannot be moved outwardly.

When the member of the lock case shown in Figure 2 is placed on the member of the lock case shown in Figure 1, the side 22 cooperates with the side 5 and the side 23 cooperates with the side 4. The depression 26 registers with the depression 15 and forms a seat for the end 31 of the shackle 30. The shank of the shackle 30 operates in the opening 25. The rib 27 bears on the tumblers 35, as hereinbefore explained. Those ends of the tumblers 35 which are adjacent to the shank 32 of the shackle 30 are received slidably between the teeth of the rack 24 (Figure 3), it being recalled that the teeth of the rack 24 project at right angles to the teeth of the racks 10, 8 and 7. The wards 28 extend across the key way 17, as shown in Figure 3. Securing elements 36 connect the ears 29 and 6 of the members of the lock case, and hold the said members together.

In practical operation, the body 39 of the key 37 is inserted into the key way 17 through the hole 18. When the inner end of the key abuts against the member 2, the fingers 40 on the key are alined with the tumblers 35. When the key is rotated, the tumblers 35 are received in the notches 41 of the fingers 40 of the key and are lifted out of engagement with the rack 33 on the shank 32 of the shackle 30, the shank of the shackle thus being set free for outward sliding movement. When the free ends of the tumblers 35 are moved as aforesaid, the said ends reciprocate between the teeth of the rack 24 on the member of the lock case shown in Figure 2. Note Figure 3 of the drawings at this point.

In order to change the lock, the key 37 is replaced by another key constructed in general like the key 37 but having its fingers 40 spaced more or less widely apart than are the fingers on the key 37, the tumblers 35 being shifted to match up with the fingers of the new key. It is obvious that the lock may be adapted to many different keys, owing to the construction alluded to.

It is impossible to insert a tool into the key way 17 and move the tumblers 35 out of engagement with the rack 33 on the shank of the shackle 30, because the wards 28 project far enough toward the plate 1 to prevent such an operation (see Figure 5).

The master key 42 may be used for opening any and all locks of the general class described, since the notches 46 in the flange of the master key are adapted to receive the wards 28 and to permit a rotation of the master key.

Having thus described the invention, what is claimed is:—

1. A padlock comprising a case having racks and provided with a key way; tumbler rods shiftable in the racks, to adapt the lock to different keys, the rods being extended across the key way, one end of each tumbler rod being slidable in one rack; means carried by the case for holding the other end of each tumbler in the other rack; and a shackle comprising a part slidable in the case and having means for cooperating with the tumblers.

2. A padlock comprising a case having a key-way; a tumbler rod extended transversely of the key-way; means for mounting the tumbler rod in adjusted positions longitudinally of the key-way to permit the lock to be opened by different keys; and a shackle having means wherewith the tumbler engages.

3. A padlock comprising a case having a rack and a key-way; a spring tumbler rod extended transversely of the key way, the tumbler rod being shiftable along the rack to permit the lock to be opened by different keys, one end of the rod being received in the rack; means for holding said end of the rod in the rack; and a shackle having means wherewith the tumbler engages.

4. A pad-lock comprising a case provided with spaced racks, and having a key-way; a tumbler rod extended transversely of the key-way, one end of the tumbler rod being received in one rack, and the other end of the tumbler rod being slidable in the other rack, the tumbler rod being shiftable in the racks to enable the lock to be opened by different keys; and a shackle having means wherewith the tumbler rod engages.

In testimony that I claim the foregoing as my own, I have hereto affixed my signature in the presence of two witnesses.

CHARLES W. SNEDEKER.

Witnesses:
THOMAS WELCH.
EDWARD T. McLIN.